(12) United States Patent
Amit et al.

(10) Patent No.: US 10,395,145 B2
(45) Date of Patent: *Aug. 27, 2019

(54) DEDUPLICATION RATIO ESTIMATION USING REPRESENTATIVE IMAGES

(71) Applicant: International Business Machines Corporation, Armonk, NY (US)

(72) Inventors: Jonathan Amit, Omer (IL); Danny Harnik, Tel Mond (IL); Ety Khaitzin, Holon (IL); Sergey Marenkov, Tel Aviv (IL)

(73) Assignee: International Business Machines Corporation, Armonk, NY (US)

(*) Notice: Subject to any disclaimer, the term of this patent is extended or adjusted under 35 U.S.C. 154(b) by 753 days.

This patent is subject to a terminal disclaimer.

(21) Appl. No.: 15/063,532

(22) Filed: Mar. 8, 2016

(65) Prior Publication Data

US 2017/0262466 A1   Sep. 14, 2017

(51) Int. Cl.
*G06K 9/66* (2006.01)
*G06F 9/44* (2018.01)
(Continued)

(52) U.S. Cl.
CPC ............ *G06K 9/66* (2013.01); *G06F 3/0608* (2013.01); *G06F 3/0641* (2013.01);
(Continued)

(58) Field of Classification Search
None
See application file for complete search history.

(56) References Cited

U.S. PATENT DOCUMENTS 8,484,356 B1   7/2013  Douglis et al.
8,639,669 B1 * 1/2014  Douglis ............... G06F 3/0641
                                              707/692
(Continued)

FOREIGN PATENT DOCUMENTS

EP   2651092 B1   8/2015

OTHER PUBLICATIONS

Alon et al., "The space complexity of approximating the frequency moments*", A prelminary version of this paper appeared in Proceedings of the 28th Annual ACM Symposium on Theory of Computing (STOC), May 1996, pp. 1-19.
(Continued)

*Primary Examiner* — Amresh Singh
(74) *Attorney, Agent, or Firm* — Alexander G. Jochym (57) ABSTRACT

A computer-implemented method includes receiving a set of representative machine image regions for a computing environment wherein the set of representative machine image regions collectively comprise a set of representative image chunks. The method also includes generating a fingerprint for each representative image chunk within the set of representative image chunks to produce a set of representative fingerprints, generating a fingerprint for selected image chunks within a measured machine image region to produce a set of sampled fingerprints, and determining a deduplication metric for the measured machine image region based on the representative fingerprints and the sampled fingerprints. A corresponding computer program product and computer system are also disclosed herein.

16 Claims, 6 Drawing Sheets

(51) Int. Cl.
    *G06F 9/455*     (2018.01)
    *G06K 9/00*     (2006.01)
    *G06K 9/46*     (2006.01)
    *G06F 9/451*     (2018.01)
    *G06F 3/06*     (2006.01)

(52) U.S. Cl.
    CPC .............. *G06F 3/0683* (2013.01); *G06F 9/44* (2013.01); *G06F 9/452* (2018.02); *G06F 9/45558* (2013.01); *G06K 9/00026* (2013.01); *G06K 9/4642* (2013.01); *G06F 2009/45562* (2013.01)

(56) References Cited

U.S. PATENT DOCUMENTS

| | | |
|---|---|---|
| 8,650,163 B1 | 2/2014 | Harnik et al. |
| 8,712,963 B1 | 4/2014 | Douglis et al. |
| 8,793,226 B1 | 7/2014 | Yadav et al. |
| 8,930,307 B2 | 1/2015 | Colgrove et al. |
| 9,026,752 B1 | 5/2015 | Botelho |
| 9,152,333 B1 | 10/2015 | Johnston et al. |
| 2013/0013865 A1 | 1/2013 | Venkatesh et al. |
| 2013/0185258 A1 | 7/2013 | Bestler et al. |
| 2014/0304239 A1 | 10/2014 | Lewis et al. |
| 2015/0067286 A1 | 3/2015 | Colgrove et al. |

OTHER PUBLICATIONS

Chambliss et al., "Managing De-Duplication Using Estimated Benefits", U.S. Appl. No. 14/450,889, filed Aug. 4, 2014, 42 pages.
Charikar et al., "Towards Estimation Error Guarantees for Distinct Values", POD 2000, Dallas, TX US © ACM 2000, 1-58113-218-x/00/05, pp. 268-279.
Constantinescu et al., "Quick Estimation of Data Compression and De-Duplication for Large Storage Systems", 2011 First International Conference on Data Compression, Communications and Processing, 978-0-7695-4528-8/11, © 2011 IEEE, DOI 10.1109/CCP.2011.41, pp. 98-102.
Gibbons, Phillip, B., "Distinct-Values Estimation over Data Streams", Intel Rearch Pittsburgh, Pittsburgh, PA 15213, USA, printed on Dec. 4, 2015, 27 pages.
Harnik et al., "Estimation of Deduplication Ratios in Large Data Sets", 978-1-4673-1747-4/12, © 2012 IEEE, 11 pages.
Harnik et al., "To Zip or not to Zip: Effective Resource Usage for Real-Time Compression*", IBM Research—Haifa, USENIX Association, 11th USENIX Conference on File and Storage Technologies (FAST '13), pp. 229-241.
Jayaram et al., "An Empirical Analysis of Similarity in Virtual Machine Images", Middleware 2011 Industry Track, Dec. 12, 2011, Lisbon, Portugal, Copyright 2011 ACM 978-1-4503-1074-1/11/12, 6 pages.
Kane et al., "An Optimal Algorithm for the Distinct Elements Problem", PODS'10, Jun. 6-11, 2010, Indianapolis, Indiana, USA, Copyright 2010 ACM 978-1-4503-0033-9/10/06, 13 pages.
Raskhodnikova et al., "Strong Lower Bounds for Approximating Distribution Support Size and the Distinct Elements Problem*", Siam J. Comput., vol. 39, No. 3, pp. 813-842, © 2009 Society for Industrial and Applied Mathematics.
Sharma et al., "Singleton: System-wide Page Deduplication in Virtual Environments", HPDC'12, Jun. 18-22, 2012, Delft, The Netherlands, Copyright 2012 ACM 978-1-4503-0805-2/12/06, pp. 15-26.
Valiant et al., "Estimating the Unseen: An n/log(n)-sample Estimator for Entropy and Support Size, Shown Optimal via New CLTs*", STOC'11, Jun. 6-8, 2011, San Jose, California, USA, Copyright 2011 ACM 978-1-4503-0691-1/11/06, 10 pages.
Wang et al., "Using Elasticity to Improve Inline Data Deduplication Storage Systems", 2014 IEEE International Conference on Cloud Computing, 978-1-4799-5063-8 2014, pp. 785-792, <http://ieeexplore.ieee.org/ielx7/6968679/6973706/06973815.pdf?tp=&arnumber=6973815&isnumber=6973706>.
Kie et al., "Estimating Duplication by Content-based Sampling", Advance Technology Group, NetApp Inc., USENIX Association, 2013 USENIX Annual Technical Conference (USENIX ATC'13), pp. 181-186.
Harnik et al., "Deduplication Ratio Estimation Using an Expandable Basis Set", U.S. Appl. No. 15/063,550, filed Mar. 8, 2016, 35 pages.
IBM Appendix P, list of patents and patent applications treated as related, Mar. 8, 2016, 2 pages.
Harnik et al., "Deduplication Ratio Estimation Using an Expandable Basis Set", U.S. Appl. No. 15/600,880, filed May 22, 2017, 32 pages.
IBM Appendix P, list of patents and patent applications treated as related, filed herewith, 2 pages.

* cited by examiner

DEDUPLICATION RATIO ESTIMATION USING REPRESENTATIVE IMAGES

BACKGROUND OF THE INVENTION

The present invention relates generally to data deduplication and more particularly to deduplication ratio estimation.

The ability to estimate accurate deduplication ratios can improve system planning and reduce the effort and expense required to match storage capacity to storage needs.

SUMMARY

As disclosed herein, a computer-implemented method includes receiving a set of representative machine image regions for a computing environment wherein the set of representative machine image regions collectively comprise a set of representative image chunks. The method also includes generating a fingerprint for each representative image chunk within the set of representative image chunks to produce a set of representative fingerprints, generating a fingerprint for selected image chunks within a measured machine image region to produce a set of sampled fingerprints, and determining a deduplication metric for the measured machine image region based on the representative fingerprints and the sampled fingerprints. A corresponding computer program product and computer system are also disclosed herein.

DETAILED DESCRIPTION

The embodiments disclosed herein enable accurate estimation of deduplication ratios in computing environments such as those associated with data centers, virtual desktop infrastructures, virtual server infrastructures, cloud computing, and the like.

It should be noted that references throughout this specification to features, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following drawings, description and appended claims, or may be learned by the practice of the invention as set forth hereinafter.

Figure 1:
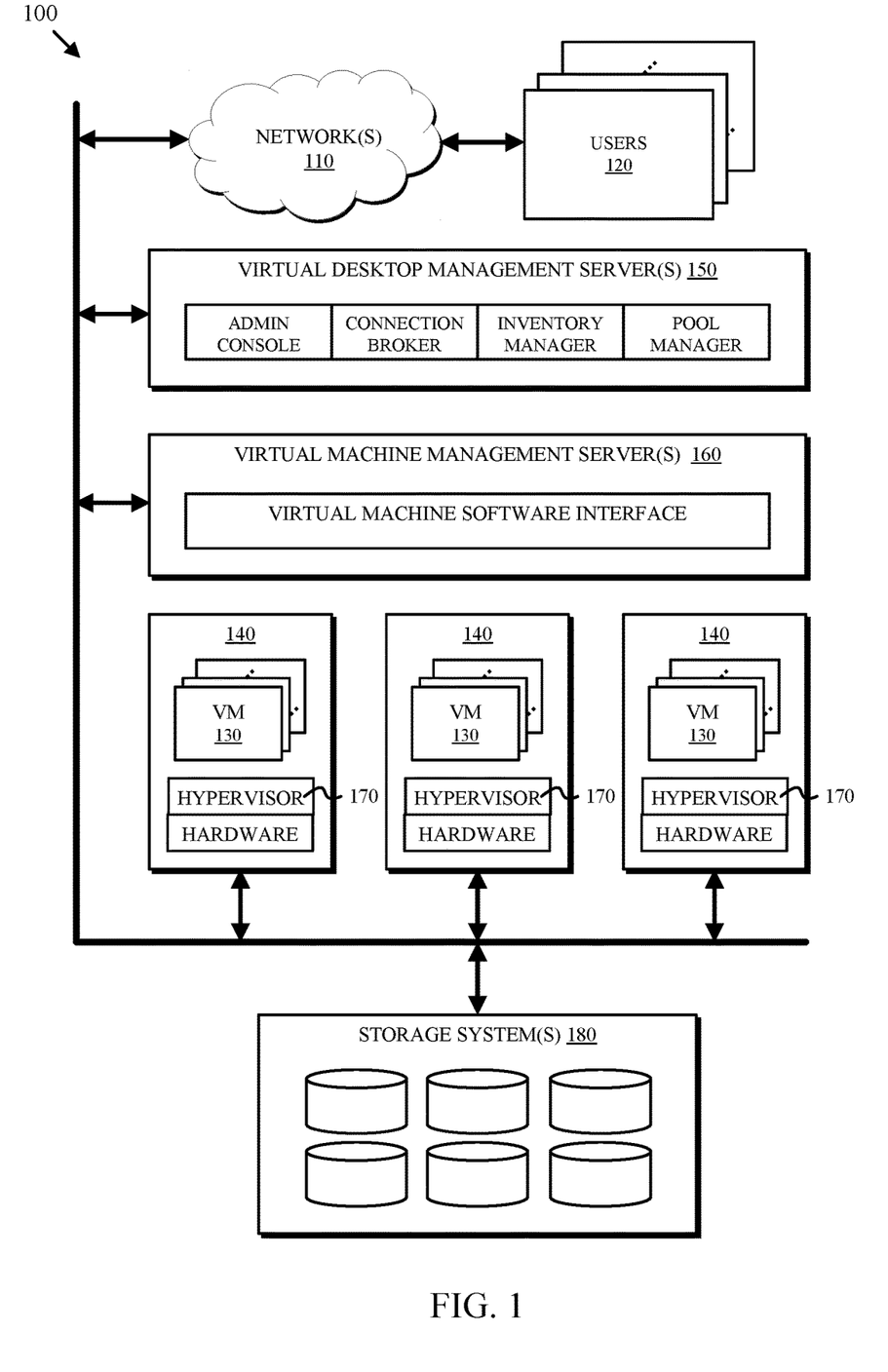
FIG. 1 is a block diagram depicting one example of a virtual desktop infrastructure in accordance with at least one embodiment of the present invention.

FIG. 1 is a block diagram depicting one example of a virtual desktop infrastructure 100 in accordance with at least one embodiment of the present invention. The virtual desktop infrastructure 100 may be associated with a multiuser cloud computing environment or the like. As depicted, the infrastructure 100 includes one or more networks 110 that enable users 120 to access virtual machines 130 executing on servers 140 as directed by a virtual desktop management server 150. The virtual machines 130 may be controlled and managed by a virtual machine management server 160 via hypervisors 170. Machine images (not shown) comprising both instructions and data may be stored on one or more storage systems 180 and partially or wholly loaded (e.g., paged) onto the servers 150 as needed. Multiple computing environments corresponding to particular types or sets of users, may be simultaneously supported by the infrastructure 100.

One issue related to the infrastructure 100 and similar computing infrastructures is determining the amount of storage that must be provided by the storage systems 180. In some scenarios, the (virtual) machine images used by the users are highly redundant and may be based on one or more "golden images" with only small variations in the data or applications used by the users 120. In other scenarios, there is little redundancy between the virtual machine images. Consequently, the amount of required storage (e.g., to support additional users, move to an upgraded infrastructure 100, or store de-duplicated machine images) is highly scenario dependent.

Another issue is that some of the storage systems 180, and/or devices included therein, may support deduplication. Therefore, data with high deduplication potential is preferably directed to those storage devices or systems that support deduplication. Consequently, an accurate estimate of the deduplication potential of data is highly desirable.

The embodiments disclosed herein recognize that while providing highly accurate deduplication estimates is highly desirable, the cost of doing a full scan of every machine image within a computing infrastructure, and the computing environments provided thereby, is nearly always prohibitive. In response to the above issues, the embodiments disclosed herein determine deduplication ratios at a specified level of accuracy using selected image chunks rather than every image chunk.

Figure 2:
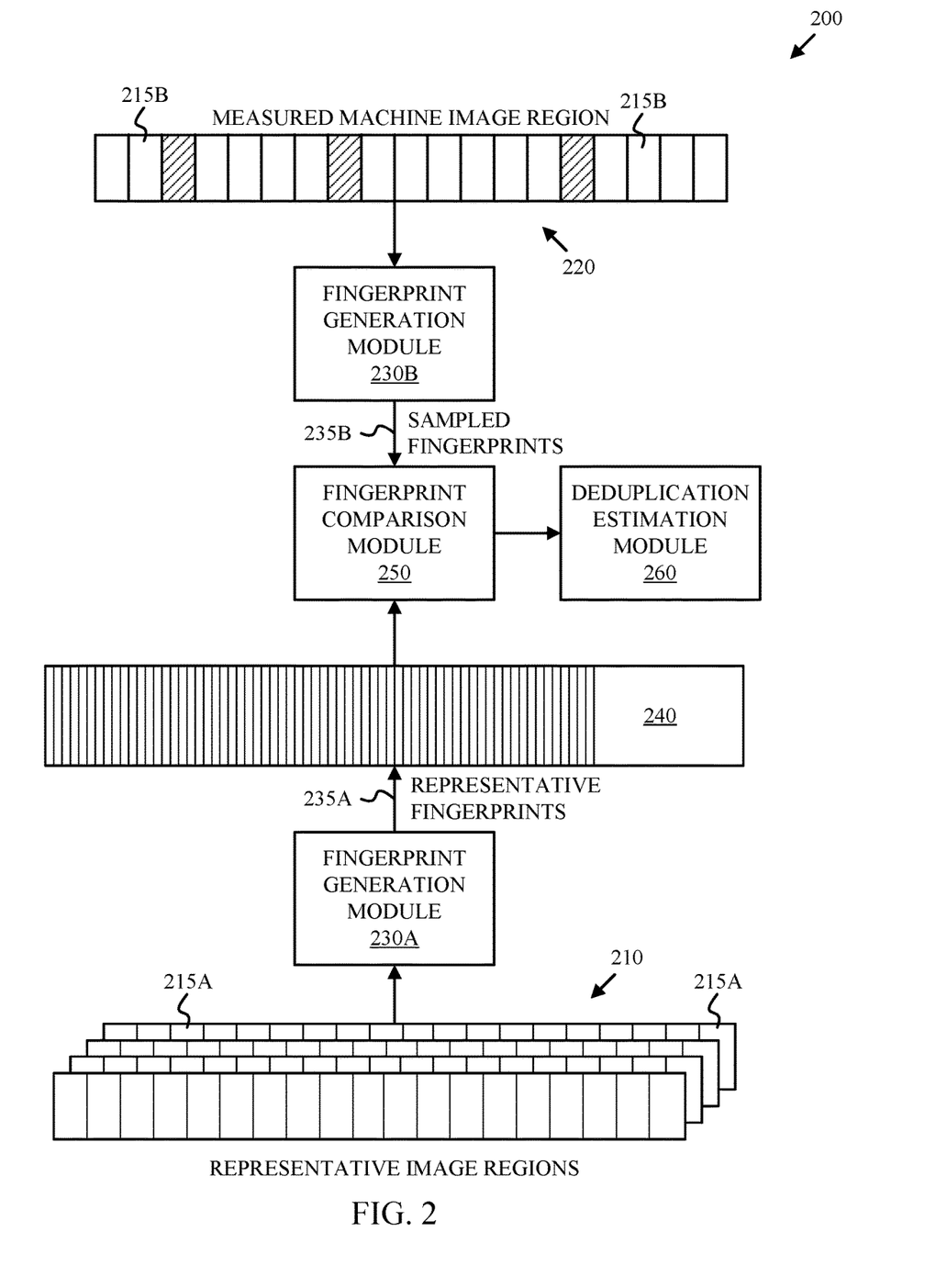
FIG. 2 is a block diagram depicting one example of a deduplication estimation apparatus in accordance with at least one embodiment of the present invention.

FIG. 2 is a block diagram depicting one example of a deduplication estimation system 200 in accordance with at least one embodiment of the present invention. As depicted, the deduplication estimation system 200 includes a representative image regions set 210, a measured (virtual) machine image region 220, fingerprint generation modules 230, a representative fingerprint memory 240, a fingerprint comparison module 250, and a deduplication estimation module 260. The deduplication estimation system 200 enables estimation of a deduplication ratio of a computer, a cluster of computers, and/or the storage systems or subsystems associated therewith.

The representative image regions set 210 is a set of representative machine image regions. The representative image regions set 210 may be provided by a user or system administrator or automatically extracted from a virtual computing environment. In some embodiments, the representative image regions set 210 includes all regions from one or more golden images (not shown) that are replicated when a virtual machine is instantiated in a virtual computing environment.

The measured machine image region 220 is a (virtual) machine image region for which a deduplication ratio is to be estimated. For example, the measured machine image region 220 may be a machine image region in a virtual computing environment that is not a representative image region. In some embodiments, every machine image region in a virtual computing environment (or a selected subset thereof) that is not a representative image region is selected as the measured machine image region 220 and a deduplication ratio is determined for each selected machine image region. The deduplication ratios for the various machine image regions may be used to determine an overall deduplication ratio for a computing infrastructure or a portion thereof.

The image regions 210 and 220 may be formed of chunks 215 (i.e., 215A and 215B, respectively). In certain embodiments, the chunks 215 comprise one or more units of storage such as block-level units of storage. In those embodiments, deduplication ratio estimation may be conducted on storage regions (and storage devices) in addition to the image regions described herein. For example, multiple backups may be made in a computing environment or infrastructure at different instances in time using various data types. In instances where the same type of data is backed up multiple times, the archived data may have high levels of data duplication. However, since there is typically very little deduplication across data types, identifying a representative set of storage regions for the main data types of data that are used or archived in a storage system will typically be sufficient to provide an accurate estimation of the overall deduplication ratio. The ability to determine an accurate storage deduplication ratio for storing data can improve system planning for storage and archiving systems, and the like, without requiring metadata that describes the various types of data to be stored or archived.

The fingerprint generation modules 230 generate fingerprints 235 for the chunks 215. For example, the fingerprint generation modules 230 may generate a hash for each chunk 215 that is used to compare chunks without requiring comparison of each data value within the chunks 215. The depicted fingerprint generation module 230A generates representative fingerprints 235A for the chunks 215A within the representative image regions 210. The depicted fingerprint generation module 230B generates sampled fingerprints 235B for selected chunks 215B of the measured machine image region 220. In the depicted embodiment, the selected (i.e., sampled) chunks are shown with a diagonal fill pattern.

The representative fingerprint memory 240 stores the representative fingerprints 235A and makes them available to the fingerprint comparison module 250. The fingerprint comparison module 250 compares the sampled fingerprints 235B to representative fingerprints 235A and indicates to the deduplication estimation module 260, which (or how many) chunks 215B that are sampled from the measured machine image region 220, match chunks 215A within the representative images 210. The deduplication estimation module 260 may estimate an overall deduplication ratio for the measured machine image region(s) and/or a computing environment or infrastructure from the information provided by the fingerprint comparison module.

Figure 3:
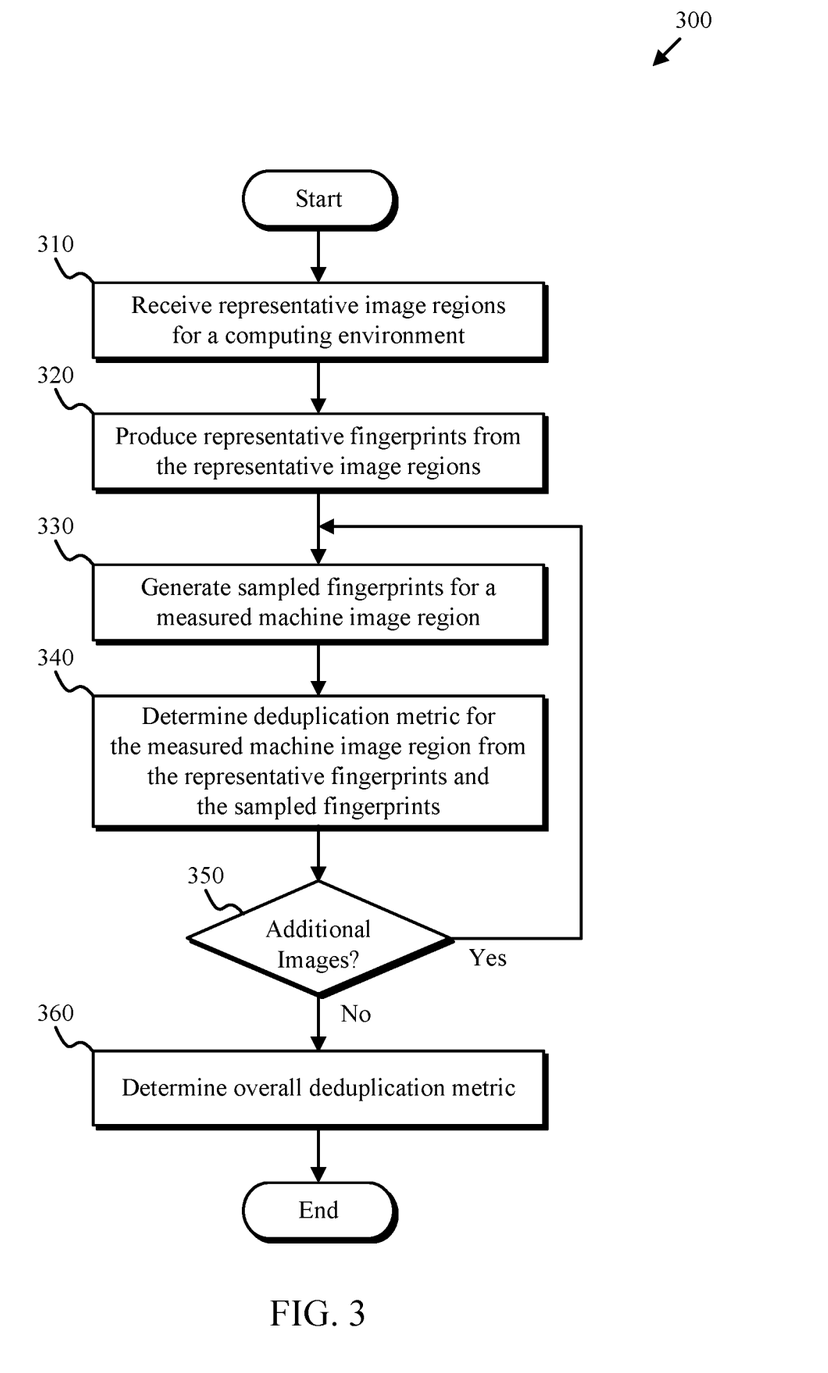
FIG. 3 is a flowchart depicting one example of a first deduplication estimation method in accordance with at least one embodiment of the present invention.

FIG. 3 is a flowchart depicting one example of a first deduplication estimation method 300 in accordance with at least one embodiment of the present invention. As depicted, the first deduplication estimation method 300 includes receiving (310) representative image regions, producing (320) representative fingerprints, generating (330) sampled fingerprints for the measured machine image region, determining (340) a deduplication metric, determining (350) whether additional image regions need to be processed, and determining (360) an overall deduplication metric. The method 300 may be conducted in conjunction with the deduplication estimation system 200 or any appropriately configured computing system.

Receiving (310) representative image regions may include receiving a set of representative machine image regions for a computing environment such as the representative image regions 210. Producing (320) representative fingerprints may include generating a fingerprint for each chunk 215A within the set of representative image regions 210.

Generating (330) sampled fingerprints for the measured machine image region may include generating fingerprints for selected chunks 215B of one or more measured machine image regions 220 to produce sampled fingerprints 235B. The sampled fingerprints 235B may be stored within a specific region of memory such as the representative fingerprint memory 240 to facilitate retrieval and comparison.

Determining (340) a deduplication metric may include comparing the sampled fingerprints 235B with the representative fingerprints 235A to determining a count or ratio (or a similar metric) of the selected chunks 215B that match chunks 215A within the representative image regions 210. The number of sampled fingerprints that are generated from the measured machine image region and compared with the representative fingerprints may correspond to a desired or selected accuracy for the deduplication metric.

Determining (350) whether additional image regions need to be processed may include determining whether any machine image region 220 remains to be measured. If additional image regions remain, the method loops to the generating operation 330. If no additional image regions need to be processed, the method continues by determining (360) the overall deduplication metric.

Determining (360) the overall deduplication metric may include using the deduplication measurements for each of the measured machine image regions 220 as well as the representative machine image regions and the sizes of the various image regions to compute an overall deduplication ratio or the like. For example, determining (360) the overall deduplication metric may include summing or averaging deduplication metrics for the representative machine image regions and the measured machine image regions according to the respective image sizes. Determining (360) the overall deduplication metric may also include accounting for unallocated storage blocks within a storage device or system in order to obtain an accurate assessment of the storage space required by a computing environment.

In some embodiments, determining (360) the overall deduplication metric also includes factoring an estimated compression ratio for the representative machine image regions and the measured machine image regions into the overall deduplication metric. In certain embodiments, the estimated compression ratio is determined from the selected image chunks.

Determining (360) the overall deduplication metric may also include factoring an inner deduplication ratio (chunks that are duplicated within the same image) for at least one of the measured machine image regions into the overall deduplication metric. In some embodiments, the inner deduplication ratio for the measured machine image regions is assumed to be substantially equal to an inner deduplication ratio computed for at least one representative machine image region. In one embodiment, an overall deduplication ratio r is computed according to the formula:

$$r = \Sigma(d_i * c_i * s_i) / \Sigma(s_i) \quad (1)$$

where $s_i$ is the size of an image region i, $d_i$ is the deduplication ratio of the image region i, $c_i$ is the compression ratio of the image region i, and the summation operations $\Sigma$ are conducted over all of the image regions i in the set of measured machine image regions.

One of skill in the art will appreciate that by using representative image regions such as those provided by a system administrator, the system 200 and/or the method 300 are able to achieve highly accurate estimates of deduplication ratios with substantially reduced levels of processing—particularly in computing environments or infrastructures where many users use the same operating system and applications.

Figure 4:
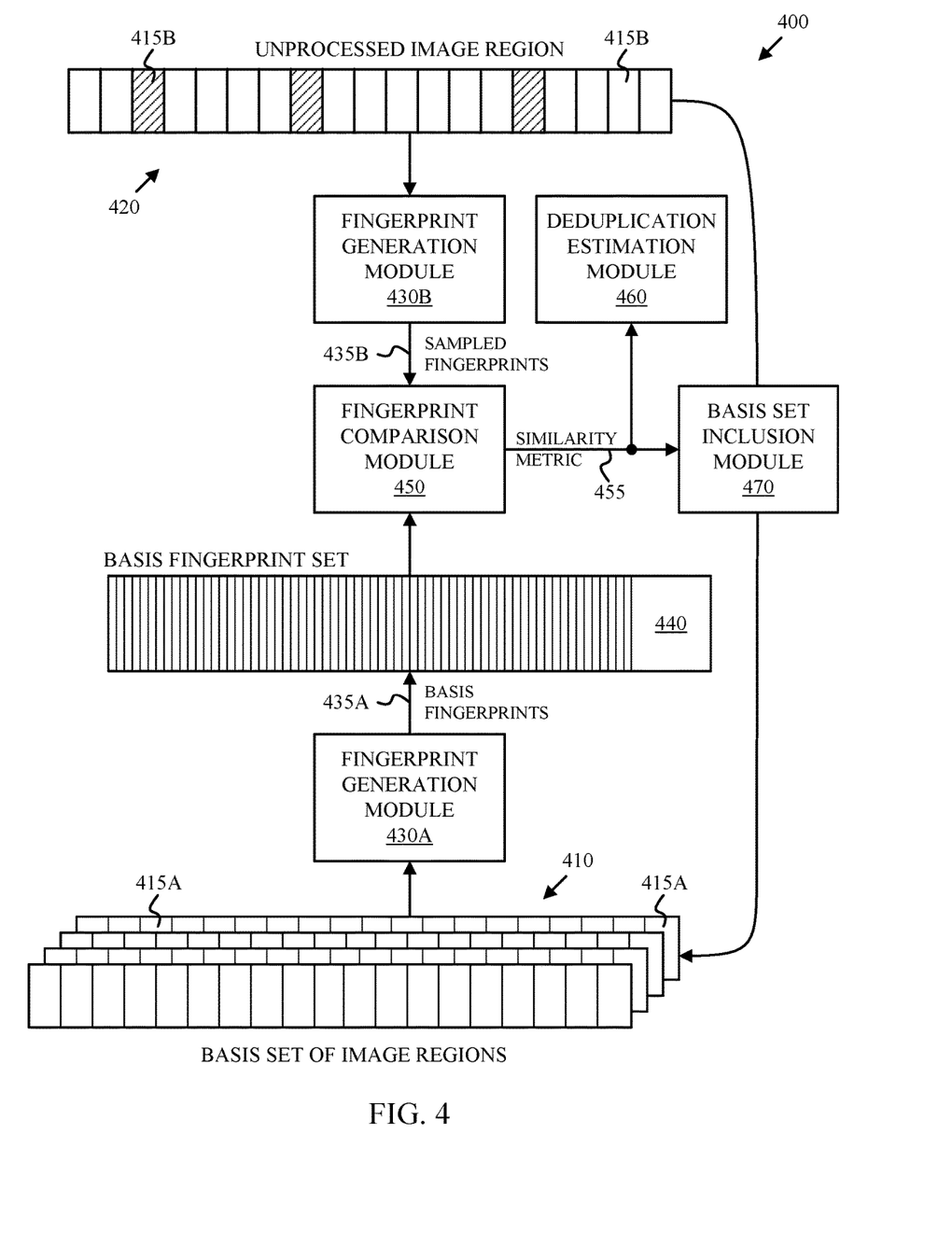
FIG. 4 is a block diagram depicting one example of a basis set formation apparatus in accordance with at least one embodiment of the present invention.

FIG. 4 is a block diagram depicting one example of a basis set formation system 400 in accordance with at least one embodiment of the present invention. As depicted, a basis set formation system 400 includes a basis set of image regions 410, an unprocessed (virtual) machine image 420, one or more fingerprint generation modules 430, a basis fingerprint memory 440, a fingerprint comparison module 450, a deduplication estimation module 460, and a basis set inclusion module 470. The basis set formation system 400 enables formation of a basis set for the purpose of estimating a deduplication ratio and/or de-duplicating (virtual) machine images in a computing environment.

The basis set of image regions 410 is a set of image regions that provide a basis for de-duplication. Initially, the basis set 410 may be an empty set that incrementally grows as unmatched regions are found. In one embodiment, the basis set 410 is seeded with one or more golden images or regions therefrom that are provided by a user or system administrator.

The unprocessed image region 420 is a (virtual) machine image region for which a deduplication ratio is to be estimated. In some embodiments, every machine image region in a virtual computing environment is selected as the unprocessed image region 420 and a deduplication ratio is determined for every machine image region. The deduplication ratios for the various machine image regions may be used to determine an overall deduplication ratio for a computing environment or a portion thereof.

The image regions 410 and 420 may be formed of chunks 415 (i.e., 415A and 415B, respectively). In certain embodiments, the regions 410 and 420 and/or the chunks 415 comprise one or more units of storage such as block-level units of storage. Similar to the use of block-level units of storage for the chunks 215, when using block-level units of storage for the chunks 415, deduplication ratio estimation may be conducted on storage regions (and storage devices) in addition to the image regions 410 and 420. Consequently, accurate determination of the storage deduplication ratio may be accomplished without requiring metadata that describes the various types of data to be stored or archived.

The fingerprint generation modules 430 generate fingerprints 435 for the chunks 415. For example, the fingerprint generation modules 430 may generate a hash for the chunks 415 that is used to compare chunks without requiring comparison of each data value within the chunks 415. The depicted fingerprint generation module 430A generates basis fingerprints 435A for the chunks 415A within the basis set of image regions 410. The depicted fingerprint generation module 430B generates sampled fingerprints 435B for selected chunks 415B of the unprocessed image region 420. In the depicted embodiment, the selected (i.e., sampled) chunks are shown with a diagonal fill pattern.

The basis fingerprint memory 440 stores the basis fingerprints 435A and makes them available to the fingerprint comparison module 450. The fingerprint comparison module 450 compares the sampled fingerprints 435B to basis fingerprints 435A and indicates to the deduplication estimation module 460 and the basis set inclusion module 470, the similarity 455 of the chunks 415B (that are sampled from the unprocessed machine image region 420) with chunks 415A within the basis set 410.

The deduplication estimation module 460 may estimate an overall deduplication ratio for the measured machine image region and/or a computing environment and associated infrastructure from the information provided by the fingerprint comparison module. The basis set inclusion module 470 may include the unprocessed image region 420 within the basis set 410 if the similarity metric 455 is less than a selected threshold.

Figure 5:
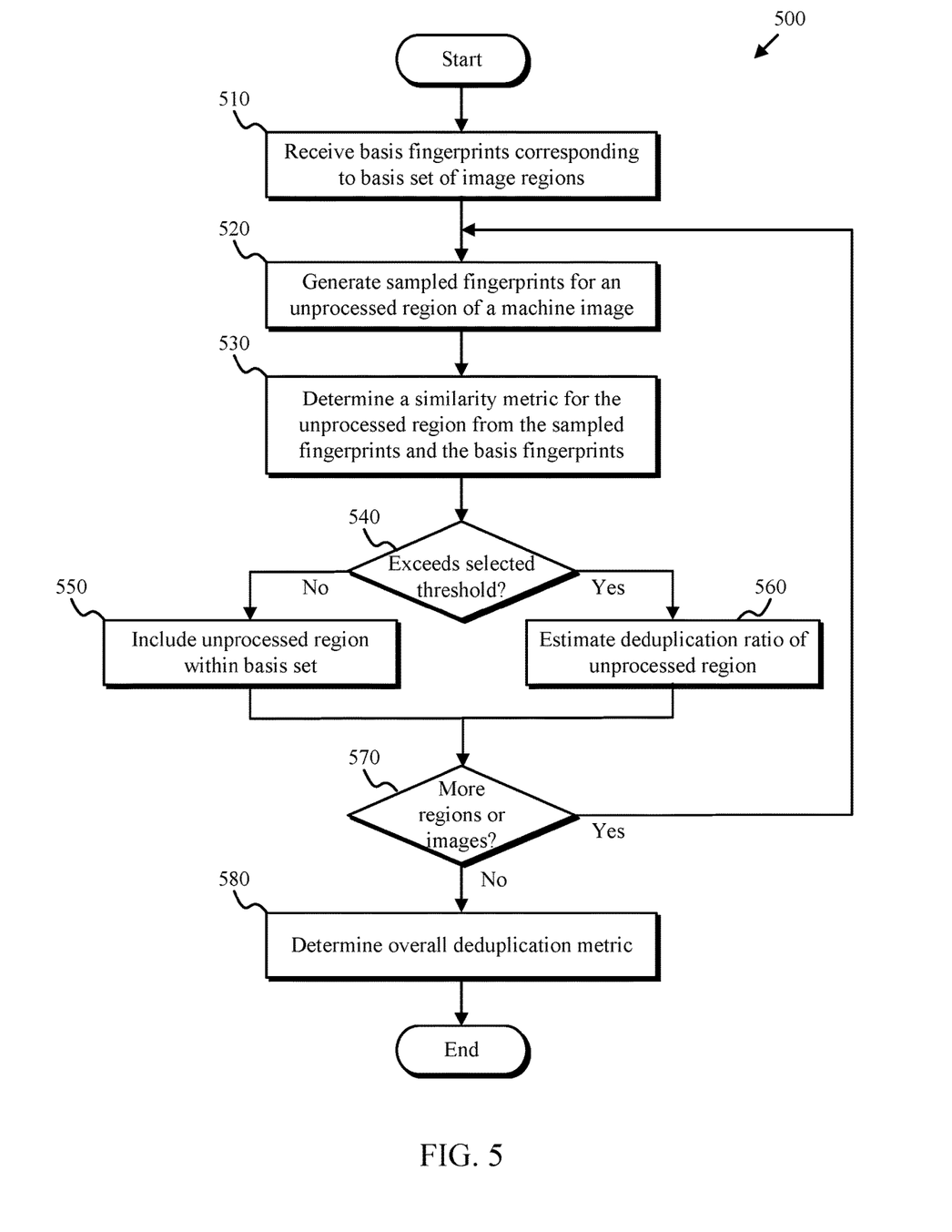
FIG. 5 is a flowchart depicting one example of a second deduplication estimation method in accordance with at least one embodiment of the present invention.

FIG. 5 is a flowchart depicting one example of a second deduplication estimation method 500 in accordance with at least one embodiment of the present invention. As depicted, the second deduplication estimation method 500 includes receiving (510) basis fingerprints, generating (520) sampled fingerprints for an unprocessed region, determining (530) a similarity metric for the unprocessed region, determining (540) whether the similarity metric exceeds a selected threshold, including (550) the unprocessed region, estimating (560) a deduplication ratio, determining (570) whether additional images or regions need to be processed, and determining (580) an overall deduplication metric. The method 500 may be conducted in conjunction with the basis set formation system 400 or any appropriately configured computing system.

Receiving (510) basis fingerprints may include receiving a set of fingerprints corresponding to chunks (e.g., chunks 415A) within a basis set of image regions (e.g., image regions 410). In some scenarios, the basis set of image regions corresponds to one or more golden images for a computing environment and the basis fingerprints are generated from the golden images.

Generating (520) sampled fingerprints for an unprocessed region may include executing a fingerprinting algorithm such as a hash algorithm on selected chunks in an unprocessed region. The selected chunks may be randomly selected.

Determining (530) a similarity metric for the unprocessed region may include comparing the sampled fingerprints for the unprocessed region with the basis fingerprints to determine a count or ratio of sampled fingerprints that match a basis fingerprint. For example, a searchable data structure such as a binary tree may be used for the basis fingerprints that enables efficient determination of whether a sampled fingerprint matches one of the basis fingerprints. In some embodiments, the similarity metric is a deduplication ratio.

Determining (540) whether the similarity metric exceeds a selected threshold may include comparing the similarity metric with the selected threshold. If the threshold is not exceeded, the method continues to the inclusion operation 550. If the threshold is exceeded, the method advances to the estimating operation 560. In some embodiments, the selected threshold may be adjusted as regions and images are processed in order to approach a selected size for the basis set of image regions and/or the basis fingerprint set (e.g., the image regions 410 and/or the basis fingerprint set 440).

Including (550) the unprocessed region (which, technically, has just been processed) may include including the unprocessed region within the basis set of image regions and generating fingerprints for each chunk within the unprocessed region. One of skill in the art will appreciate that including the unprocessed region within the basis set does not require moving the unprocessed region to a common area of memory. For example, fingerprints for each chunk within the unprocessed region may be generated while the unprocessed (i.e., just processed region) remains in place.

Estimating (560) a deduplication ratio may include using the similarity metric to determine the deduplication ratio for the unprocessed region. In some embodiments, the storage footprint for the unprocessed region is also determined. Determining (570) whether additional images or regions need to be processed may include iteratively advancing through a list of images and/or regions that are to be processed. If additional images or regions need to be processed, the method loops to the generating operation 520. If no additional images or regions need to be processed the method continues by determining (580) an overall deduplication metric.

Determining (580) the overall deduplication metric may include using the deduplication measurements produced by operation 560 to compute an overall deduplication ratio or the like. The various approaches outlined in the description of the determining operation 360 of FIG. 3 may also be applied to the determining operation 580. In some embodiments, determining (580) the overall deduplication metric involves conducting a second pass of the method 500 using the final basis set that is constructed during the first pass of the method 500. In those embodiments, the inclusion of additional image regions into the basis set of image regions (e.g., regions 410) may be disabled during the second pass.

One of skill in the art will appreciate that the various embodiments disclosed herein enable using sampled chunks rather than each chunk in a computing environment. Furthermore, the number of sampled chunks that are used may be selected to achieve a desired accuracy. One of skill in the art will also appreciate that accurate estimation of deduplication enables directed data with high deduplication potential to storage devices or systems that support deduplication.

Figure 6:
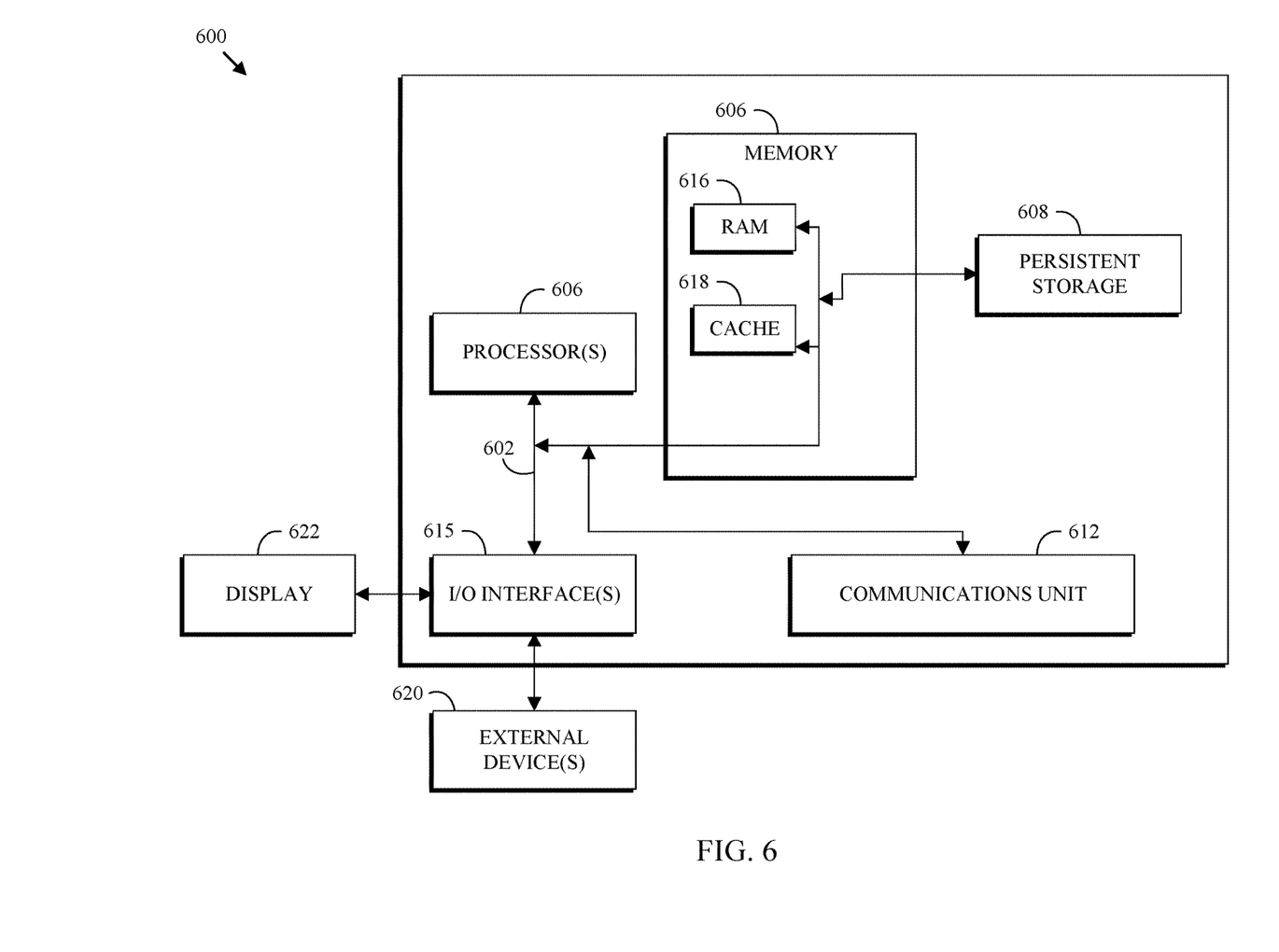
FIG. 6 is a block diagram depicting one example of a computing apparatus (i.e., computer) suitable for executing the methods disclosed herein.

FIG. 6 is a block diagram depicting one example of a computing apparatus (i.e., computer 600) suitable for executing the methods disclosed herein. It should be appreciated that FIG. 6 provides only an illustration of one embodiment and does not imply any limitations with regard to the environments in which different embodiments may be implemented. Many modifications to the depicted environment may be made.

As depicted, the computer 600 includes communications fabric 602, which provides communications between computer processor(s) 605, memory 606, persistent storage 608, communications unit 612, and input/output (I/O) interface(s) 615. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer readable storage media. In the depicted embodiment, memory 606 includes random access memory (RAM) 616 and cache memory 618. In general, memory 606 can include any suitable volatile or non-volatile computer readable storage media.

One or more programs may be stored in persistent storage 608 for execution by one or more of the respective computer processors 605 via one or more memories of memory 606. The persistent storage 608 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 612, in these examples, provides for communications with other data processing systems or devices. In these examples, communications unit 612 includes one or more network interface cards. Communications unit 612 may provide communications through the use of either or both physical and wireless communications links.

I/O interface(s) 615 allows for input and output of data with other devices that may be connected to computer 600. For example, I/O interface 615 may provide a connection to external devices 620 such as a keyboard, keypad, a touch screen, and/or some other suitable input device. External devices 620 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 608 via I/O interface(s) 615. I/O interface(s) 615 may also connect to a display 622. Display 622 provides a mechanism to display data to a user and may be, for example, a computer monitor.

One of skill in the art will appreciate that the above disclosed embodiments may be adapted for a variety of environments and applications. Furthermore, the programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The embodiments disclosed herein include a system, a method, and/or a computer program product. The computer program product may include a computer readable storage medium (or media) having computer readable program instructions thereon for causing a processor to carry out the methods disclosed herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that this description is not intended to limit the invention. On the contrary, the embodiments presented are intended to cover some of the alternatives, modifications, and equivalents, which are included in the spirit and scope of the invention as defined by the appended claims. Further, in the detailed description of the disclosed embodiments, numerous specific details are set forth in order to provide a comprehensive understanding of the claimed invention. However, one skilled in the art would understand that various embodiments may be practiced without such specific details.

Although the features and elements of the embodiments disclosed herein are described in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method, executed by one or more processors, the method comprising:
   receiving a set of representative machine image regions for a computing environment wherein the set of representative machine image regions collectively comprise a set of representative image chunks;
   generating a fingerprint for each representative image chunk within the set of representative image chunks to produce a set of representative fingerprints;
   generating a fingerprint for selected image chunks within a measured machine image region to produce a set of sampled fingerprints;
   determining a deduplication metric for the measured machine image region based on the representative fingerprints and the sampled fingerprints; and
   determining an overall deduplication metric for the representative machine image regions and a plurality of measured machine image regions, wherein determining the overall deduplication metric is conducted according to the formula $r=\Sigma(d_i*c_i*s_i)/\Sigma(s_i)$, where $s_i$ is the size of an image region $i$, $d_i$ is a deduplication ratio of the image region $i$, $c_i$ is a compression ratio of the image region $i$, and the summation operations $\Sigma$ are conducted over all of the image regions $i$ in the plurality of measured machine image regions.

2. The method of claim 1, further comprising factoring an estimated compression ratio into the overall deduplication metric.

3. The method of claim 2, wherein the estimated compression ratio is determined from the selected image chunks.

4. The method of claim 1, further comprising factoring an inner deduplication ratio for at least one of the measured machine image regions into the overall deduplication metric.

5. The method of claim 4, further comprising assuming that the inner deduplication ratio is substantially equal to an inner deduplication ratio computed for at least one representative machine image region.

6. The method of claim 1, wherein the number of sampled fingerprints corresponds to a selected accuracy.

7. The method of claim 1, wherein the deduplication metric comprises a ratio or count of sampled fingerprints that match representative fingerprints.

8. The method of claim 1, wherein the set of representative machine image regions are provided by a user or system administrator.

9. The method of claim 1, wherein the computing environment is a virtual computing environment.

10. The method of claim 9, wherein the virtual computing environment comprises a virtual desktop infrastructure or a virtual server infrastructure.

11. The method of claim 1, wherein the set of representative image chunks and the selected image chunks comprise block-level units of storage.

12. The method of claim 11, wherein determining the overall deduplication metric comprises accounting for unallocated storage blocks.

13. The method of claim 11, further comprising estimating a deduplication ratio for a storage region or device.

14. A computer program product comprising:
   one or more computer readable storage media and program instructions stored on the one or more computer readable storage media, the program instructions comprising instructions executable by a computer to perform:
   receiving a set of representative machine image regions for a computing environment wherein the set of representative machine image regions collectively comprise a set of representative image chunks;
   generating a fingerprint for each representative image chunk within the set of representative image chunks to produce a set of representative fingerprints;
   generating a fingerprint for selected image chunks within a measured machine image region to produce a set of sampled fingerprints;
   determining a deduplication metric for the measured machine image region based on the representative fingerprints and the sampled fingerprints; and
   determining an overall deduplication metric for the representative machine image regions and a plurality of measured machine image regions, wherein determining the overall deduplication metric is conducted according to the formula $r=\Sigma(d_i*c_i*s_i)/\Sigma(s_i)$, where $s_i$ is the size of an image region $i$, $d_i$ is a deduplication ratio of the image region $i$, $c_i$ is a compression ratio of the image region $i$, and the summation operations $\Sigma$ are conducted over all of the image regions $i$ in the plurality of measured machine image regions.

15. The computer program product of claim 14, wherein the program instructions further comprise instructions executable by a computer to factor an estimated compression ratio into the overall deduplication metric.

16. A computer system comprising:
   one or more computers;
   one or more computer readable storage media and program instructions stored on the one or more computer readable storage media for execution by at least one of the computers, the program instructions comprising instructions executable by a computer to perform:
   receiving a set of representative machine image regions for a computing environment wherein the set of representative machine image regions collectively comprise a set of representative image chunks;
   generating a fingerprint for each representative image chunk within the set of representative image chunks to produce a set of representative fingerprints;
   generating a fingerprint for selected image chunks within a measured machine image region to produce a set of sampled fingerprints;
   determining a deduplication metric for the measured machine image region based on the representative fingerprints and the sampled fingerprints; and
   determining an overall deduplication metric for the representative machine image regions and a plurality of measured machine image regions, wherein determining the overall deduplication metric is conducted according to the formula $r=\Sigma(d_i*c_i*s_i)/\Sigma(s_i)$, where $s_i$ is the size of an image region $i$, $d_i$ is a deduplication ratio of the image region $i$, $c_i$ is a compression ratio of the image region $i$, and the summation operations $\Sigma$ are conducted over all of the image regions i in the plurality of measured machine image regions.

* * * * *